US008024795B2

(12) United States Patent
Newton

(10) Patent No.: US 8,024,795 B2
(45) Date of Patent: Sep. 20, 2011

(54) NETWORK INTELLIGENCE SYSTEM

(75) Inventor: Chris Newton, Douglas (CA)

(73) Assignee: Q1 Labs, Inc., San Francisco, CA (US)

( * ) Notice: Subject to any disclaimer, the term of this patent is extended or adjusted under 35 U.S.C. 154(b) by 1466 days.

(21) Appl. No.: 10/435,142

(22) Filed: May 9, 2003

(65) Prior Publication Data

US 2004/0250122 A1 Dec. 9, 2004

(51) Int. Cl.
G06F 12/14 (2006.01)
G08B 23/00 (2006.01)

(52) U.S. Cl. .................. 726/22; 726/23; 726/25

(58) Field of Classification Search ............ 726/23, 726/22
See application file for complete search history.

(56) References Cited

U.S. PATENT DOCUMENTS

| 5,557,742 | A | | 9/1996 | Smaha et al. |
|---|---|---|---|---|
| 5,787,253 | A | | 7/1998 | McCreery et al. |
| 5,796,942 | A | | 8/1998 | Esbensen |
| 5,892,903 | A | | 4/1999 | Klaus |
| 5,991,881 | A | | 11/1999 | Conklin et al. |
| 6,061,723 | A | | 5/2000 | Walker et al. |
| 6,088,804 | A | * | 7/2000 | Hill et al. ................ 726/25 |
| 6,134,664 | A | | 10/2000 | Walker |
| 6,173,325 | B1 | | 1/2001 | Kukreja |
| 6,269,447 | B1 | | 7/2001 | Maloney et al. |
| 6,275,942 | B1 | | 8/2001 | Bernhard et al. |
| 6,279,113 | B1 | | 8/2001 | Vaidya |
| 6,282,546 | B1 | | 8/2001 | Gleichauf et al. |
| 6,298,445 | B1 | | 10/2001 | Shostack et al. |
| 6,321,338 | B1 | | 11/2001 | Porras et al. |
| 6,347,374 | B1 | | 2/2002 | Drake et al. |
| 6,370,648 | B1 | | 4/2002 | Diep |
| 6,453,345 | B2 | | 9/2002 | Trcka et al. |
| 6,460,141 | B1 | | 10/2002 | Olden |
| 6,687,390 | B2 | * | 2/2004 | Avni et al. ................ 382/119 |
| 7,073,198 | B1 | * | 7/2006 | Flowers et al. ............ 726/25 |
| 7,228,566 | B2 | * | 6/2007 | Caceres et al. ............ 726/25 |
| 2001/0034847 | A1 | * | 10/2001 | Gaul, Jr. ................ 713/201 |

(Continued)

FOREIGN PATENT DOCUMENTS

EP 1 130 870 A2 9/2001

(Continued)

OTHER PUBLICATIONS

International Search Report for PCT Application No. PCT/CA2004/000693, mailed Aug. 13, 2004, 3 pages.

(Continued)

Primary Examiner — Benjamin E Lanier
(74) Attorney, Agent, or Firm — Goodwin Procter LLP

(57) ABSTRACT

A network security system takes an active approach to network security. This is accomplished by providing intelligence about other networks. A master network intelligence database is established that uses a plurality of network information agents for gathering information about networks and providing the information to the master network intelligence database. A customer network security system is then able to secure the customer network in dependence upon information received from the master network intelligence. Security information includes at least one of hostility level on the Internet, collected from numerous sites; security event history; spam levels; hosted services; public wireless; organization type; organization associations; peer ISPs; bandwidth connection to the Internet; active security measures; number of users on the network; age of the network; inappropriate content served; industry; geographic placement; open proxy servers; and contact information.

34 Claims, 3 Drawing Sheets

U.S. PATENT DOCUMENTS

| | | | |
|---|---|---|---|
| 2001/0039579 A1 | 11/2001 | Trcka et al. | |
| 2002/0019945 A1 | 2/2002 | Houston et al. | |
| 2002/0026591 A1 | 2/2002 | Hartley et al. | |
| 2002/0031134 A1 | 3/2002 | Poletto et al. | |
| 2002/0069370 A1* | 6/2002 | Mack | 713/201 |
| 2002/0078381 A1 | 6/2002 | Farley et al. | |
| 2002/0087882 A1* | 7/2002 | Schneier et al. | 713/201 |
| 2002/0087885 A1* | 7/2002 | Peled et al. | 713/201 |
| 2002/0105911 A1 | 8/2002 | Pruthi et al. | |
| 2002/0138762 A1 | 9/2002 | Horne | |
| 2002/0144146 A1 | 10/2002 | Lortz | |
| 2002/0144156 A1 | 10/2002 | Copeland, III | |
| 2002/0194495 A1* | 12/2002 | Gladstone et al. | 713/200 |
| 2003/0051026 A1 | 3/2003 | Carter et al. | |
| 2003/0061514 A1* | 3/2003 | Bardsley et al. | 713/201 |
| 2003/0084349 A1 | 5/2003 | Friedrichs et al. | |
| 2003/0163729 A1* | 8/2003 | Buchegger | 713/201 |

FOREIGN PATENT DOCUMENTS

| | | |
|---|---|---|
| EP | 1 143 660 A2 | 10/2001 |

OTHER PUBLICATIONS

Written Opinion for PCT Application No. PCT/CA2004/000693, mailed Aug. 13, 2004, 5 pages.

Office Action issued in Canadian Patent Application No. 2,428,192, mailed Jul. 12, 2010, 2 pages.

* cited by examiner

NETWORK INTELLIGENCE SYSTEM

FIELD OF THE INVENTION

The present invention relates to method and apparatus for network security and is particularly acquiring and using knowledge about networks.

BACKGROUND OF THE INVENTION

The rapid development of the Internet, World Wide Web and E-commerce has made it increasingly important to be able to monitor the traffic going into and coming out of a network in order to discover abnormal network traffic that may be an indication of attacks from hackers or misuse of network resources by users inside the network. A network of computers may be attacked by a hacker using Smurf, Denial of Services (DoS), or be abused by a rogue employee within the network, who may attack some other networks or download pornography.

Various network security software, such as firewalls, Intrusion Detection Systems (IDS), network monitors, and vulnerability assessment tools, have been developed to protect a network from abuse and hacking.

IDS systems are used to spot, alert, and stop intrusions. Typically running on dedicated computers hooked to the network, IDS systems actively monitor network traffic for suspicious activities. Statistics or rule-based artificial intelligence is used to detect abnormal activities. Thus, IDS systems depend on the recognition of known attack patterns. For example, contents in the network traffic may be monitored to match the patterns in an IDS system's databases. The real-time analysis of the network traffic provides the capability to send instant notifications via e-mails, pager alerts, or other means. Based on a predefined security policy, some IDS systems can take defensive actions against intrusions, such as initiating the termination of network connections or changing the configuration of network devices (e.g., firewalls and routers). Since hacking activities and misuse of new patterns are under constant development, IDS systems are also under constant development.

IDS systems have a number of weaknesses. IDS systems depend on the recognition of known attack patterns, sequences, or signatures. Currently known signatures of attacks are collected to write rules to detect and disable network activities with these signatures. However, IDS systems cannot detect or stop the attacks of unknown signatures. IDS systems have to be upgraded when the rules are updated to handle attacks of signatures that are only recently recognized.

A grave concern of network administrators is the exponential increase in attacks seen as the size and reach of the Internet increases with time. A consequence of this is that in the foreseeable future IDSs on networks will be overwhelmed by such attacks and will no longer be able to keep pace with mutating forms of attack.

All of the above issues and techniques and structures to address the issue arise for the anonymous nature of data communications. Unlike real world interactions between people where an identity is exchanged fairly early in the conversation, in cyber space ones identity and hence ones reputation can hide behind a network address. To make matters worse, the Internet is stateless, that is it does not retain information about previous activity that would affect current activity. For example an end user could try to hack into a private network, send an e-mail to a fellow hacker about the attempt and then do on-line banking, without any of the previous activity affecting their access to the banking network.

Even on a larger scale, such as a network, there is no way on knowing whom you are dealing with other than relying on anecdotal information. As a consequence network administrators have to rely on tools to detect intrusion and misuse. The concern is that this kind of behavior will continue to increase to the point where current methods will be overwhelmed by the numbers of such incidents.

SUMMARY OF THE INVENTION

An object of the present invention is to provide an improved method and apparatus for network security.

Security is really all about knowledge, which is something that security devices and networks clearly lack. Everyday, in the real world, we use our knowledge, and records of people, places, and things, to make decisions about them. We don't hire people based only on what they look like when they are standing at our door. We don't let people into the country without proper identification and records. The thought of doing so seems foolish, but it is exactly what security devices and networks do every day, for every communication that occurs. IDSs and firewalls have no other information available to them other then what the packet looks like, standing at the door.

Network and security devices have no way of knowing to whom they are talking on the other side, none at all. Am I talking to a network that is extremely hostile? Known to be a hacker haven? Do they employ active security devices over there? Or are they just wide open . . . making it irrelevant if I try to secure info I send them? Am I violating my own security by talking to them? Do I need to be accepting email from sites known to be heavy spam domains, and are from far flung continents my company never communicates with anyway? Is this a competitor of mine? If so, why are they requesting the info they are requesting. Even if they have firewalls and we are communicating securely, can I trust that they are who they say they are, since they are allowing public access to their wireless networks? What if some hacker parks outside their window? Why do I need to open my network to the risks associated with communicating with open university networks, or residential ISP networks? How can I prioritize traffic that comes from large enterprises, to ensure they get good service? How can I stop my IDS from generating so many false positives, why can't it tell the difference between a possible security problem on a highly secured, trusted partner network of mine, and the same event from the University of XXX's student network, one of the most hostile networks in the world?

These questions, and many more, can be answered, with the present invention, a Network Intelligence Database. Every network in the world would have a record in the database, with a large number of properties. Some properties might be:

Hostility level on the Internet;
Security event history;
Spam levels;
Hosted services (web servers, email servers);
Public wireless;
Organization type: educational, enterprise, military;
Organization associations: owned by, partnered with whom;
Peer ISPs;
Bandwidth connection to the Internet;
Active security measures, firewalls, IDSs;

Number of users, employees, people on this network;

Age of the network;

Inappropriate content served (hate sites, porn, pirated software);

Industry: industrial, computers;

Geographic placement;

Open proxy servers; and

Address, contact information.

Accordingly, system and method of the present invention establish respective reputations for networks and allow a given network to determine whether to communicate with a particular network in dependence upon its reputation.

In accordance with an aspect of the present invention there is provided a network security system for providing intelligence about other networks comprising: a master network intelligence database including a first communication interface; a plurality of network information agents for gathering information about networks and providing the information to the master network intelligence database via the communication interface; and a second communication interface for a customer network security system securing a network in dependence upon information from the master network intelligence database.

In accordance with another aspect of the present invention there is provided a network security system for providing intelligence about other networks comprising: a master network intelligence database including first and second communication interfaces; a plurality of network information agents for gathering information about networks and providing the information to the master network intelligence database via the first communication interface; and a customer network security system for securing a network in dependence upon information received from the master network intelligence database via the second communication interface.

In accordance with a further aspect of the present invention there is provided a method of network security system providing intelligence about other networks comprising the steps of: gathering information about networks; storing the information in a master network intelligence database; and securing a customer network in dependence upon information received from the master network intelligence database.

An advantage of the present invention is providing security based upon the reputation of networks.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1:
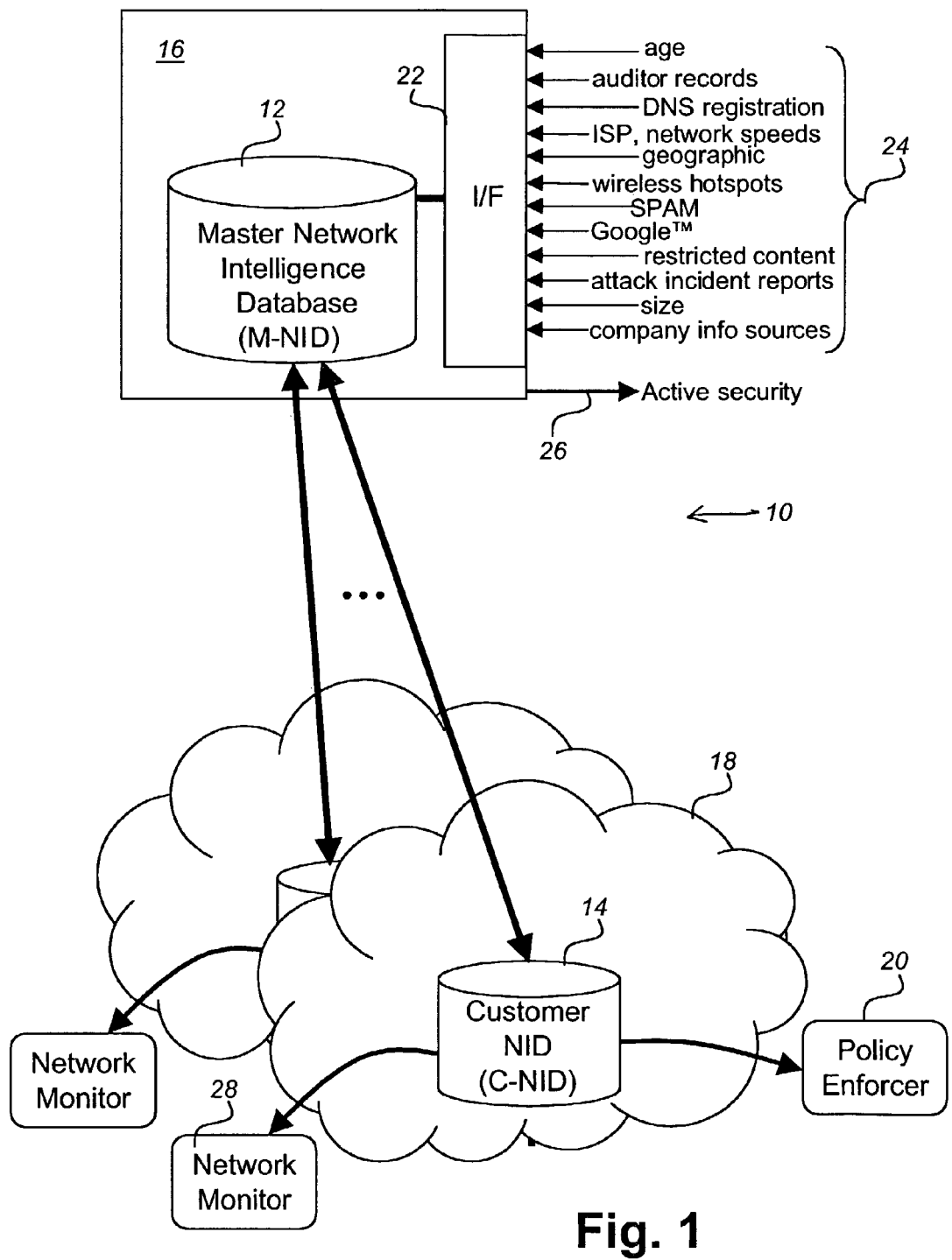
FIG. 1 illustrates apparatus for network security in accordance with an embodiment of the present invention.

Referring to FIG. 1 apparatus for network security in accordance with an embodiment of the present invention. The apparatus 10 includes a master network intelligence database (M-NID) 12, and a plurality of customer network intelligence databases (C-NID) 14. The Master NID resides at a location 16 offering the service, and customers 18 obtain a Customer NID 14, or C-NID, from the service provider 16. The Master NID 12 then feeds the customers' NID 14 updates as new data are collected. A Policy enforcer (PE) 20 layered on top of the C-NID 14 interfaces with services and devices on a customer company network 18. The PE 20 allows an administrator to take conceptual ideas of who he wants his network to talk to, not talk to, or how he wants to configure services, and turns them into the technical rules sets that the devices require.

In operation, the PE 20 talks to the C-NID 14, turns concepts into rules and feeds the rules to the NID device agents 40 installed on the customer network security devices.

The Master NID 12 includes information on networks through properties 22 of those networks and applies both a weighting system to those properties and time sensitivity (how things become less or more important over time).

The Customer NID (C-NID) 14 includes information on networks, receives real-time updates from the Master-NID 12 that include properties, and has a multi-user weighting system and time sensitivity. The C-NID (Custom-NID) includes a real-time interface for receiving live remote updates from the Mater-NID. It also includes data mining and searching capability.

Figure 2:
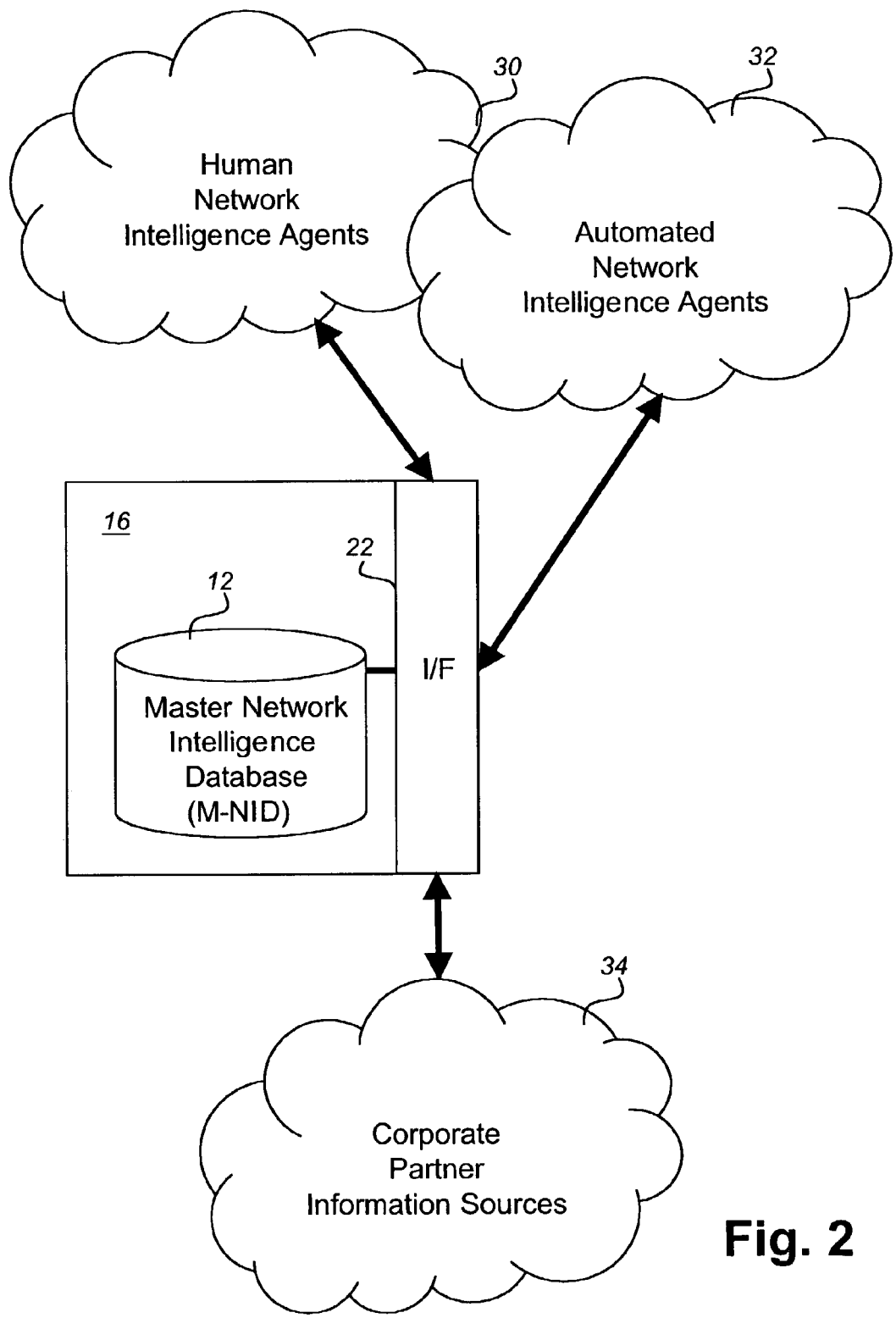
FIG. 2 illustrates further detail of the apparatus of FIG. 1.

Referring to FIG. 2, there is illustrated further detail of the apparatus of FIG. 1. The master NID 12 gathers information from a number of sources, for example human NID information agents 30, automated NID information agents 32 and corporate partner information sources 34.

NID information agents are provided at the M-NID service provider, for example these could include:

1. Perimeter Security Agent—These are the agents from M-NID service provider that scour the Internet, looking for evidence of perimeter security measures in place at remote networks.

2. Newgroup/Forum Agent—performing linguistic analysis to glean information about the networks.

3. Search Engine Agent, for example a Google™ Agent.

4. Public Web agent, gleans information from public websites.

Figure 3:
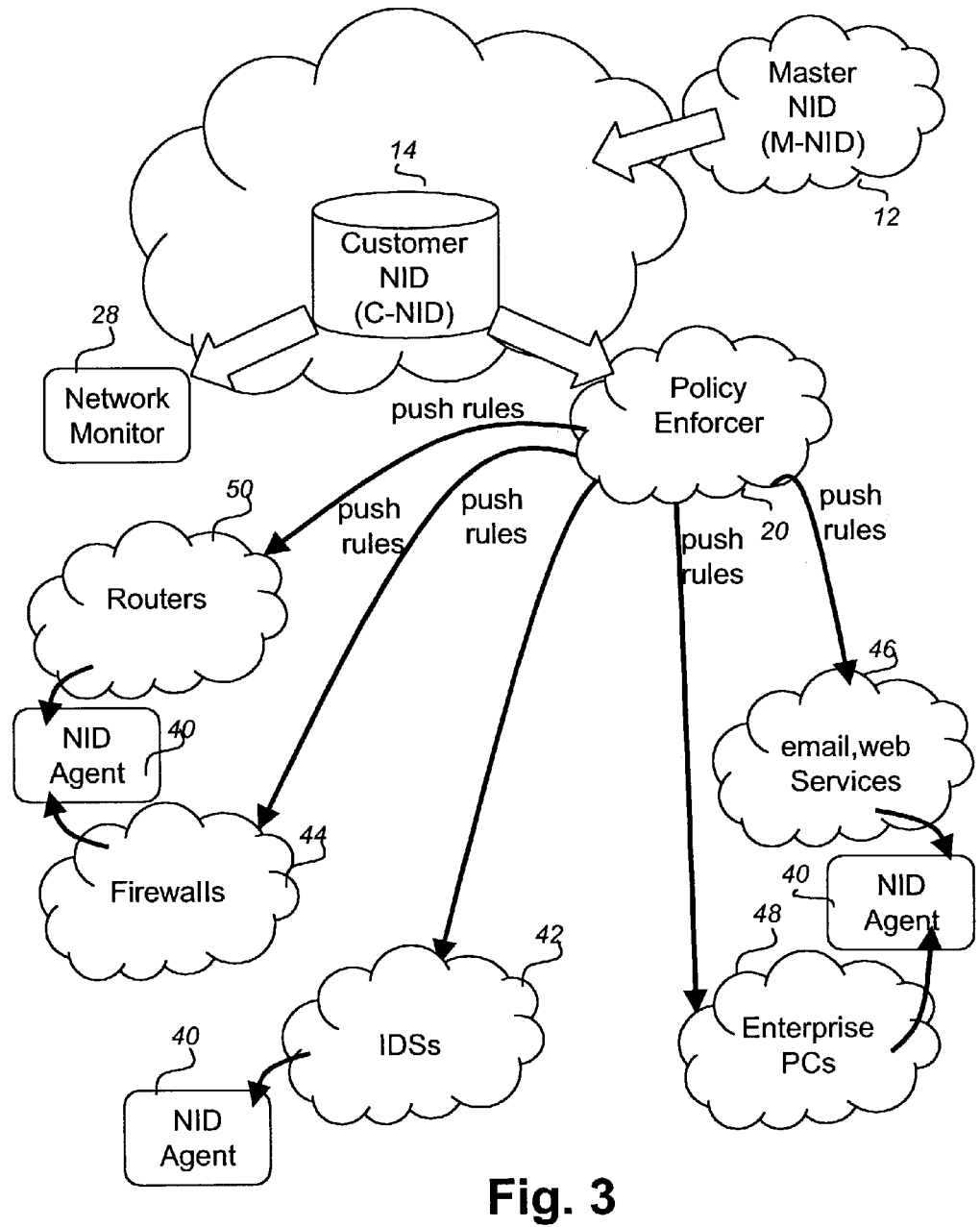
FIG. 3 illustrates operation of the apparatus of FIG. 1.

Referring to FIG. 3, there is illustrated operation of the apparatus of FIG. 1. At each customer network 18, the customer deploys NID device agents 40 on all of its network devices.

The Policy enforcer 20 takes concepts "lets not talk to anyone without a firewall if they have public wireless", and turns it into rule sets for the NID device agents 40. Agents are built for all devices to allow them to accept policies from the PE and bring intelligence to all devices on a network. Hence, PCs do not talk to hostile networks, nor accept traffic from SPAM senders.

For example, there are NID device agents for IDS 42, firewall 44, servers 46 (web, email), PCs 48 and routers 50. The PE tells IDS NID device agents how to reduce false positives and filter or enhance alerts from the IDS. The PE tells Firewall NID device agents how block or modify traffic based on it's new knowledge of the remote networks.

In operation, the Master NID 12 resides at a location 16 offering the service, and customers 18 obtain a Customer NID 14, or C-NID, from the service provider 16. The Master NID 12 then feeds the customers' NIDs 14 updates as new data are collected or changed.

The Policy enforcer PE 20 layered on top of the C-NID 14 interfaces with services 46 and devices 42, 44, 48, 50 on a customer company network 18 via the NID device agents. The PE 20 allows an administrator to take conceptual ideas of who he wants his network to talk to, not talk to, or how he wants to configure services, and turns them into the technical rules sets that the devices require via info from the C-NID. For example, the statement "I don't see any need for accepting mail from any residential ISP outside North America, nor from Universities, or other sites that have a high spam rating". The Policy enforcer 20 then takes that concept, and with the help of the C-NID 14, turns it into a rule set of matching networks, and feeds it to the NID device agent on the mail server 46. Other examples are: "Any network with a reasonably high hostility level, or doesn't employ active security devices should have a higher priority for my IDS alerts"; "I don't want any of my competitors, or associated parent companies or networks getting access to my in depth technology white papers".

The NID information agents are the autonomous agents that run on computers at the NID service provider. The NID information agents constantly probe information sources on the Internet and feed that information into the M-NID via a network connection to the central NID server. The NID information agents take a number of forms, but all of them share the fact that they feed information into the M-NID. The NID information agents may be content search information agents that read through newsgroups and glean information therefrom. Or, the NID information agents may be active probing information agents, which send packets to remote networks and glean information from the responses received to those packets.

NID device agents are agents that convert policy enforcer rules, which are in a generic format, into specific rules for the device in question. The NID device agent resides on the customer's device, and communicates over the customer's network with the policy enforcer. For example, if the policy enforcer 20 were asked to block Universities with the name 'UABC' in the title, that existed in Canada, the policy enforcer 20 would turn that concept into a generic rule 'Block 123.456/16'. This generic rule is then fed to all the NID device agents the customer's network. For example a NID device agent on a LINUX box, which turns the generic rule into a rule for the particular firewall technology on the LINUX box. rule.

An alternative to NID device agents, would be using a protocol standard that network devices adhere to, which then allows the devices to understand the rules from the policy enforcer, so they would not have a need for a NID device agent. For example, the NID service provider could publish an XML standard for to which devices where to adhere.

Thus, an initial implementation of the network intelligence system would required NID device agents so that the network devices would be able to understand what the policy enforcer is asking of them to do. However, as new versions of the devices are shipped by companies they could make sure it adheres to a published XML (or other) standard, that the policy enforcer uses. Thus, no NID device agent is required on the device, because the device could talk directly to and receive rules directly from the policy enforcer.

The NID service provider 16 partners with security, intelligence, and network operations companies 34 around the world. Consequently, enterprise customers 18 may start to require certain prerequisites from the remote networks they communicate with. They may set in place enforced polices based on information in the master NID 12. For example:

Company A may no longer let you into their network unless you have an up-to-date security audit, of a certain level, from a trusted auditor.

Bank B may not allow online banking from networks without firewalls and other active security systems.

Government agency C blocks 10s of thousands of networks from accessing government sites and services in the US because those networks do not use anti-virus software.

Company D forces 100,000 desktop computers to avoid sites known to peddle copyrighted material to avoid backlash from RIAA (Recording Industry Association of America)

Firms from all sorts of areas may partner 34 with the NID service provider 16 to have their unique information available in the Master NID 12, to be used by customers 18 via the PE 20. For example Virus companies
Security companies
Business Intelligence Companies
Spam, mail companies
Wireless networking companies
Intelligence services, CIA
Security Audit companies
IDS, Firewall, Router vendors Another feature of the NID can be self-registration. Some network administers will want to register the information about their network in the M-NID to ensure that they get unimpeded access to other networks that have deployed the NID. They will readily go to https://nid_register. to enter in their corporate network information (such as if they have firewalls, size of network, security personnel contact info they could also have a third party verification of their claims via an external auditor (which strengthens the believability of the claims). Self-registering ensures that a network's info in the NID is correct. As the NID grows, self-registration becomes something that companies will want to do, to ensure that they get unimpeded access to larger networks with which they wish to communicate.

Embodiments of the present invention have the following advantages:

The Master NID 12 includes a registration system where networks can register their network, for example for a small fee. Registration then adds the network's information into the NID.

Verification of a network's claims upon registration can be done to ensure valid information and properties in the NID can reflect this. For example, the network claims to have firewalls, but this has not been verified.

By listing in the NID any security audit certificates the network may hold, other networks can be assured of the nature of the network with which they are communicating. The NID service provider partners with companies that secure networks.

Numerous modifications, variations and adaptations may be made to the particular embodiments of the present invention described above without departing from the scope of the invention as defined in the claims.

What is claimed is:

1. A network security system comprising:
   a master network intelligence database;
   at least one network information agent gathering information about a plurality of networks and providing the information to the master network intelligence database;
   a customer network security-system, the customer network security system comprising:
      a customer network intelligence database updated with information from the master network intelligence database, the information from the master network intelligence database including verified network information of at least one other customer network registered at the master network intelligence database by the at least one customer network, the network information comprising network security detection, prevention and remediation capabilities of the at least one other customer network;

a policy enforcer generating generic security rules based at least in part on the information in the customer network intelligence database;

at least one device agent receiving the generic security rules from the policy enforcer and converting the generic security rules into device specific rules; and at least one security device securing a customer network by blocking and allowing data packets to and from the customer network according to the device specific rules from the device agents.

2. A network security system as claimed in claim 1 wherein the at least one network information agents includes human network information agents.

3. A network security system as claimed in claim 1 wherein the at least one network information agents includes automated network information agents.

4. A network security system as claimed in claim 1 wherein the at least one network information agents includes network information agents co-located with corporate partners.

5. A network security system as claimed in claim 1 wherein the information relates to security of the first plurality of networks.

6. A network security system as claimed in claim 5 wherein the security information includes at least one of hostility level on the internet, collected from numerous sites; security event history; spam levels; hosted services; public wireless; organization type; organization associations; peer ISPs; bandwidth connection to the Internet; active security measures; number of users on the first plurality of networks; age of the-first plurality of networks; inappropriate content served; industry; geographic placement; open proxy servers; contact information; spoken language; current security audits; desktop security measures; time zone; and security personnel.

7. A network security system as claimed in claim 3 wherein the at least one network information agents includes means for probing information sources on the Internet and feeding that information into the master network intelligence database.

8. A network security system as claimed in claim 7 wherein the at least one network information agent comprises content search information agents for reading through newsgroups and gleaning information therefrom.

9. A network security system as claimed in claim 7 wherein the at least one network information agent comprises active probing information agents for sending packets to remote networks and gleaning information from the responses received to those packets.

10. A network security system as claimed in claim 7 wherein the master network intelligence database establishes the reputations for the first plurality of networks in dependence upon information provided thereto.

11. A network security system as claimed in claim 1, wherein the customer network security system includes at least one network information agents for gathering information from the at least one device agent.

12. A network security system as claimed in claim 1, wherein the at least one device agents is a component of the at least one security device.

13. A network security system as claimed in claim 1, wherein the at least one security device comprises a firewall.

14. A network security system as claimed in claim 1, wherein the at least one security device comprises an intrusion detection system (IDS).

15. A network security system as claimed in claim 1, wherein the at least one security device comprises a router.

16. A network security system as claimed in claim 1, wherein the at least one security device comprises a personal computer (PC).

17. A network security system as claimed in claim 1, wherein the at least one security device comprises a virtual private network (VPN).

18. A network security system as claimed in claim 1, wherein the at least one device agent utilizes a protocol standard to understand the rules from the policy enforcer.

19. A network security system as claimed in claim 18 wherein the protocol standard is XML.

20. A network security system as claimed in claim 1, wherein the master network intelligence database establishes the reputations for a plurality of networks in dependence upon information provided thereto.

21. A method of network security system providing intelligence about other networks comprising the steps of:

receiving information about a plurality of networks from a master network intelligence database;

updating a customer network intelligence database disposed in a customer network security system with the information about the plurality of networks, the information about the plurality of networks including verified network information of at least one other customer network registered at the master network intelligence database by the at least one customer network, the network information comprising network security detection, prevention and remediation capabilities of the at least one other customer network;

generating, at a policy enforcer, generic security rules based at least in part on the information in the customer intelligence database; and transmitting the generic security rules from the policy enforcer to at least one device agent for converting the generic security rules into device specific rules instructing at least one security device to block and allow data packets to and from the customer network security system.

22. A method of network security as claimed in claim 1, further comprising transmitting information from the at least one device agent to the master intelligence database.

23. A method of network security as claimed in claim 21 wherein the information stored in the master intelligence database is gathered by at least one network information agents.

24. A method of network security as claimed in claim 23 wherein the at least one network information agents includes human network information agents.

25. A method of network security as claimed in claim 23 wherein the at least one network information agents includes automated network information agents.

26. A method of network security as claimed in claim 23 wherein the at least one network information agents includes network information agents co-located with corporate partners.

27. A method of network security claimed in claim 21 wherein the information relates to security of networks.

28. A method of network security as claimed in claim 21, further comprising transmitting a subscription request to receive the subset of information from the master intelligence database.

29. A method of network security as claimed in claim 28 wherein transmitting a subscription request includes the step of selecting information having predetermined properties.

30. A method of network security as claimed in claim 21 further comprising publishing security audits at the master intelligence database.

31. A method of network security as claimed in claim 23, wherein gathering information includes allowing network administrators to register their network with the master intelligence database.

32. A method of network security as claimed in claim 31 wherein gathering information includes auditing any information provided by the network administrators.

33. A method of network security as claimed in claim 21, further comprising applying a time sensitivity parameter to the received information.

34. A network security system as claimed in claim 1, wherein the customer network is different then the plurality of networks having information included in the information used to update the master network intelligence database.

* * * * *

UNITED STATES PATENT AND TRADEMARK OFFICE
CERTIFICATE OF CORRECTION

| | | |
|---|---|---|
| PATENT NO. | : 8,024,795 B2 | Page 1 of 1 |
| APPLICATION NO. | : 10/435142 | |
| DATED | : September 20, 2011 | |
| INVENTOR(S) | : Christopher Newton | |

It is certified that error appears in the above-identified patent and that said Letters Patent is hereby corrected as shown below:

In Claim 2, column 7, line 12, please delete "agents" and insert --agent--.

In Claim 3, column 7, line 15, please delete "agents" and insert --agent--.

In Claim 4, column 7, line 18, please delete "agents" and insert --agent--.

In Claim 5, column 7, line 21, please delete "first".

In Claim 7, column 7, line 35, please delete "agents" and insert --agent--.

In Claim 10, column 7, line 50, please delete "first".

In Claim 12, column 7, line 57, please delete "agents" and insert --agent--.

In Claim 23, column 8, line 45, please delete "agents" and insert --agent--.

In Claim 24, column 8, line 47, please delete "agents" and insert --agent--.

In Claim 25, column 8, line 50, please delete "agents" and insert --agent--.

In Claim 26, column 8, line 53, please delete "agents" and insert --agent--.

Signed and Sealed this
Tenth Day of January, 2012

David J. Kappos
*Director of the United States Patent and Trademark Office*